(12) United States Patent
Jain et al.

(10) Patent No.: US 12,470,520 B2
(45) Date of Patent: Nov. 11, 2025

(54) WILDCARD BASED PRIVATE APPLICATION ACCESS

(71) Applicant: Palo Alto Networks, Inc., Santa Clara, CA (US)

(72) Inventors: Jayant Jain, Cupertino, CA (US); Harieasswar Lakshmidevi, San Jose, CA (US); Mingfei Peng, Pleasanton, CA (US); Brian Russell Kean, Cincinnati, OH (US); Srivatsan Rajagopal, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 144 days.

(21) Appl. No.: 18/227,595

(22) Filed: Jul. 28, 2023

(65) Prior Publication Data

US 2025/0039138 A1 Jan. 30, 2025

(51) Int. Cl.
*H04L 61/4511* (2022.01)
*H04L 9/40* (2022.01)
*H04L 12/46* (2006.01)

(52) U.S. Cl.
CPC ...... *H04L 63/0263* (2013.01); *H04L 12/4641* (2013.01); *H04L 61/4511* (2022.05)

(58) Field of Classification Search
None
See application file for complete search history.

(56) References Cited

U.S. PATENT DOCUMENTS

| | | | |
|---|---|---|---|
| 2006/0242124 A1* | 10/2006 | Fields | G06F 8/38 |
| 2014/0181248 A1* | 6/2014 | Deutsch | H04L 61/5076 709/217 |
| 2018/0295134 A1* | 10/2018 | Gupta | H04L 67/56 |
| 2019/0207837 A1* | 7/2019 | Malhotra | H04L 41/065 |
| 2022/0286431 A1* | 9/2022 | Winn | H04L 61/4511 |
| 2023/0030403 A1* | 2/2023 | Jeuk | G06F 21/606 |
| 2023/0231884 A1* | 7/2023 | Deshmukh | H04L 63/1441 726/1 |

OTHER PUBLICATIONS

Gabriel Campeanu, A Mapping Study on Microservice Architectures of Internet of Things and Cloud Computing Solutions, 7th Mediterranean Conference on Embedded Computing, MECO' 2018, Budva, Montenegro.
Liu et al., Secure Multi-Keyword Fuzzy Searches with Enhanced Service Quality in Cloud Computing, downloaded Jul. 27, 2023, pp. 1-16.
Yang et al., A Predictive Load Balancing Technique for Software Defined Networked Cloud Services, downloaded Jul. 27, 2023, pp. 1-25.

* cited by examiner

*Primary Examiner* — Christopher B Robinson
(74) *Attorney, Agent, or Firm* — Van Pelt, Yi & James LLP

(57) ABSTRACT

Techniques for wildcard based private application access are disclosed. In some embodiments, a system, a process, and/or a computer program product for wildcard based private application access includes receiving a request for access to an application over a secure access service edge (SASE) network for a user associated with an enterprise; determining if the request for access to the application matches a wildcard (e.g., the wildcard can be configured by an administrator of the enterprise for matching a fully qualified domain name (FQDN) for the application); and automatically configuring access information (e.g., IP address, protocol, and destination port) for the application that matches the wildcard.

20 Claims, 12 Drawing Sheets

WILDCARD BASED PRIVATE APPLICATION ACCESS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1A:
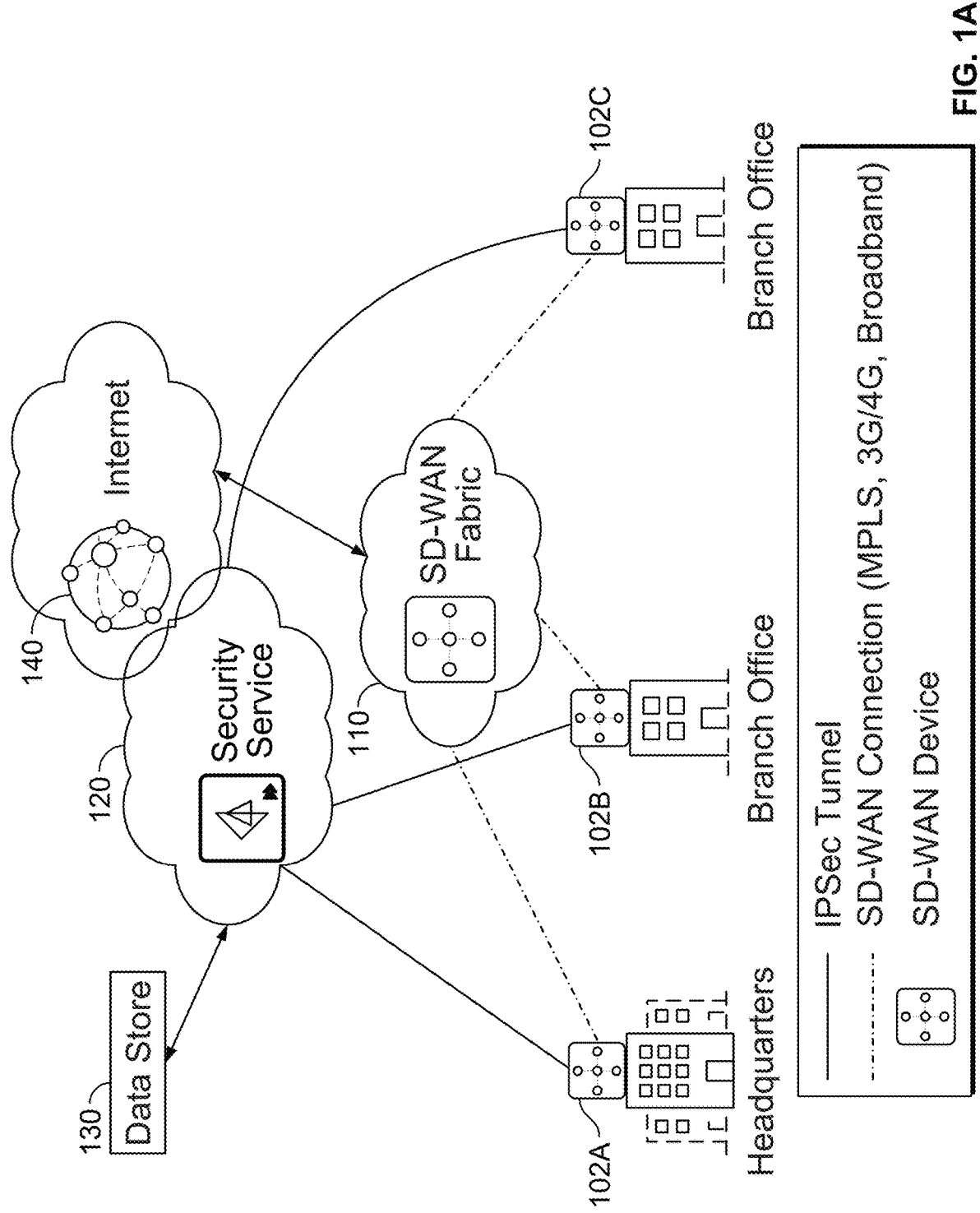
FIGS. 1A-1B are example system diagrams of a Secure Access Service Edge (SASE) environment in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Technical Challenges for Security Solutions for SASE Environments

Security service providers offer various commercially available cloud-based security solutions including various firewall, VPN, including Secure Access Service Edge (SASE), and various other security related services. For example, some security service providers have their own data centers in multiple geographies across the world to provide their customers such cloud-based security solutions.

Generally, cloud-based security services are offered by cloud-based security service providers in distinct locations/regions around the world. However, customers (e.g., enterprise customers of a given cloud-based security service provider) may have headquarters, branches, and/or other offices as well as remote users in various locations/regions that are in network communications with each other and the cloud-based security service and Internet using various SD-WAN connections (e.g., over SD-WAN fabric for the SASE service, such as Prisma Fabric for the Prisma SASE service commercially available from Palo Alto Networks, Inc., headquartered in Santa Clara, CA). As a result, the use of such SD-WAN connections facilitates network connectivity and often introduces another layer of security monitoring at each SD-WAN device at each office location (e.g., branches, headquarters, etc.) as well as at the cloud-based security service including for providing access to various enterprise and/or supported SaaS applications (e.g., located in enterprise data centers and/or various cloud-based solutions and locations/regions).

Overview of Techniques for Application Access for SASE Environments

Specifically, for private application access through a SASE solution (e.g., Prisma Access from Palo Alto Networks, Inc. headquartered in Santa Clara, CA, or another SASE solution), an IT/network/security administrator (admin) typically has to manually specify a fully qualified domain name (FQDN) to access a supported application (e.g., applications supported by the enterprise, which can include private applications executing in a data center for the enterprise or a cloud-based application, which can execute in a cloud computing environment, such as AWS, Microsoft Azure, Google Cloud Platform (GCP), etc.).

However, this is time consuming and error prone for admins to manually configure and can cause consumption issues if, for example, one has multiple applications in a data center. One example is an SSH server farm with hundreds of servers. Also, there may be cross-linking of applications/internal domains that may not have been specified in the consumption screen leading to breakage of traffic during run time.

As such, new and improved solutions for facilitating access to such private applications for SASE environments are needed.

Accordingly, various techniques for wildcard based private application access are disclosed.

In some embodiments, a system, a process, and/or a computer program product for wildcard based private application access includes receiving a request for access to an application over a secure access service edge (SASE) network for a user associated with an enterprise; determining if the request for access to an application matches a wildcard (e.g., the wildcard can be configured by an administrator of the enterprise for matching a fully qualified domain name (FQDN) for the application); and automatically configuring access information (e.g., IP address, protocol, and destination port) for the application that matches the wildcard.

In some embodiments, a system, a process, and/or a computer program product for wildcard based private application access further includes performing application discovery using probing.

In some embodiments, a system, a process, and/or a computer program product for wildcard based private application access further includes monitoring flow session data of user access.

In some embodiments, a system, a process, and/or a computer program product for wildcard based private application access further includes periodically updating a local IP address associated with the application to a virtual IP (VIP) address mapping.

In some embodiments, a system, a process, and/or a computer program product for wildcard based private application access further includes mapping the request to the application executing in a local regional data center.

In some embodiments, a system, a process, and/or a computer program product for wildcard based private application access further includes mapping the request to the application executing in a local regional data center.

In some embodiments, a system, a process, and/or a computer program product for wildcard based private application access further includes mapping the request to the application executing in an active data center.

These and other embodiments for wildcard based private application access (e.g., for a SASE environment) will be further described below with respect to various embodiments.

Example System Embodiments for Wildcard Based Private Application Access

Figure 1B:
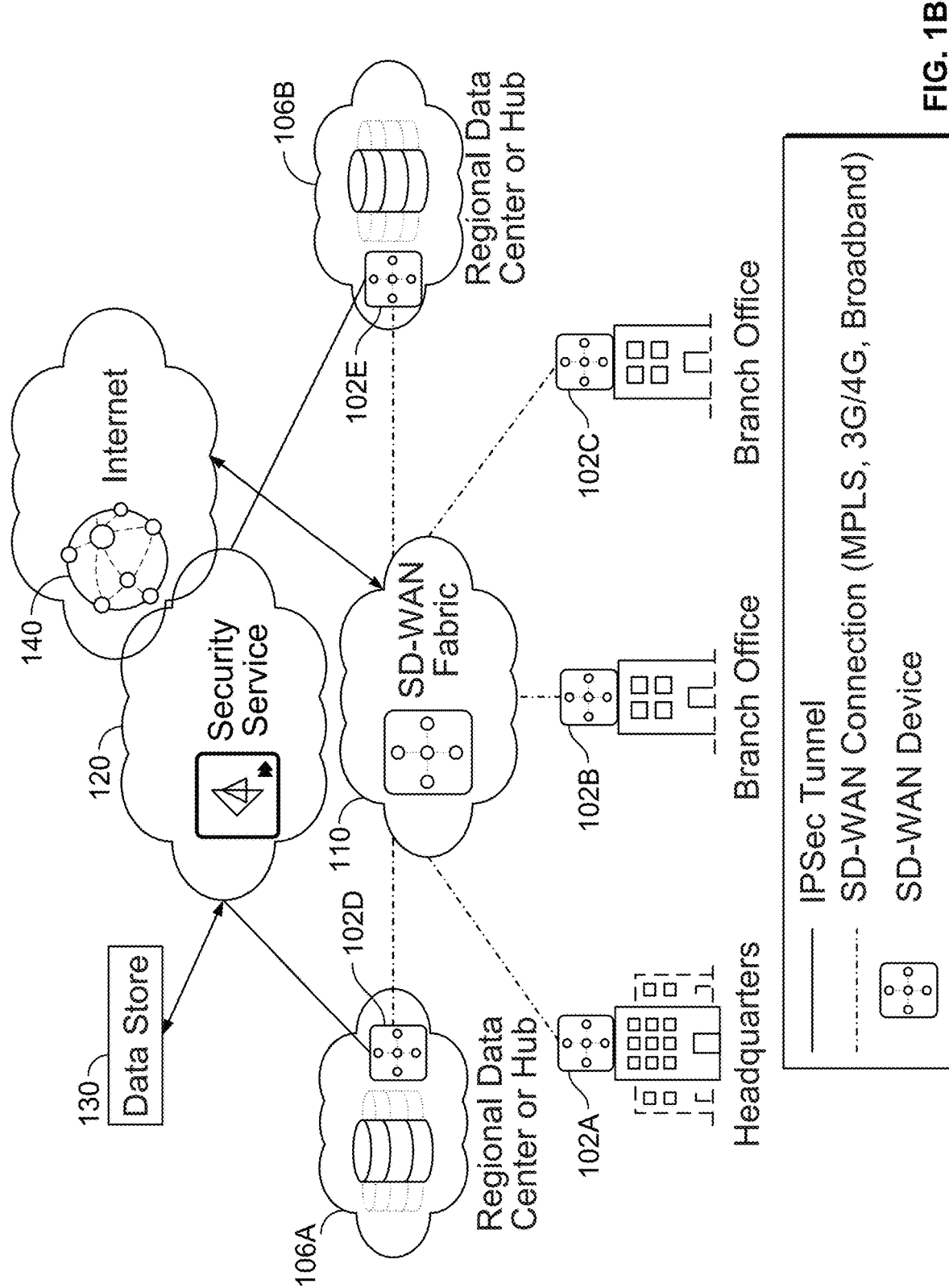

FIGS. 1A-1B are example system diagrams of a Secure Access Service Edge (SASE) environment in accordance with some embodiments. These example system diagrams generally illustrate a security service for securing branch office (e.g., remote networks (RNs)) and headquarter sites as well as remote users (e.g., Rus) with SD-WAN connections in communication with a security service (e.g., a cloud-based security service).

Generally, a secure access service edge (SASE) brings together networking and network security services in a single cloud-based platform. This way, organizations can embrace cloud and mobility while reducing the complexity of dealing with multiple point products as well as saving IT, financial, and human resources.

For example, a SASE solution can generally include networking capabilities that an enterprise already uses. SASE can integrate the following networking features into a cloud-based infrastructure: SD-WAN edge devices, VPN services, and web proxying, which are each further described below.

Software-defined wide area network (SD-WAN) edge devices can provide easier connectivity for branch offices. With SASE, these devices are connected to a cloud-based infrastructure rather than to physical SD-WAN hubs located in other locations. By moving to the cloud, enterprises can eliminate the complexity of managing physical SD-WAN hubs and promote interconnectivity between branch offices.

Virtual private network (VPN) services incorporated by a SASE solution enable enterprises to route traffic through a VPN (e.g., using IPSec tunnels) to the SASE solution, and then to any application in the public or private cloud, delivered via Software as a Service (SaaS), or on the Internet. Traditional VPN was used for remote access to the internal data center, but it is typically not optimized for the current/evolving cloud computing environment.

Web proxying provides an alternate means of securely connecting users to applications by inspecting web-based protocols and traffic. Proxies were typically used for web security enforcement, but due to their inherent security limitations, they are now typically used as an architectural alternative for device traffic that cannot be fully inspected (e.g., personal devices that cannot accept an endpoint agent to force all web and non-web traffic through security inspection). When implemented as part of a SASE solution, proxies can offer organizations with legacy architectures an easier way of adopting the more robust security capabilities SASE has to offer.

In addition, SASE can incorporate the network security service tools enterprises have generally relied upon in prior computing environments. In a comprehensive SASE solution, the following security services can be delivered through a cloud-based infrastructure: zero trust network access (ZTNA), firewall/security as a service (FWaaS), secure web gateways (SWG), data loss prevention (DLP), and cloud access security broker (CASB), which are each further described below.

Zero Trust Network Access (ZTNA) applies the Zero Trust secure computing approach (e.g., never trust, always verify) to the cloud computing environment. For example, ZTNA can be applied to require that every user authenticate to access the cloud, restricting access and minimizing the risk of, for example, data loss. However, ZTNA solutions based on a software-defined perimeter (SDP) model can lack content inspection capabilities needed for consistent security protection for enterprises. Also, moving to a cloud-based SASE infrastructure can eliminate the complexity of connecting to a gateway. For example, users, devices, and apps can be identified no matter where they connect from, and the below further described ZTNA solutions of protecting applications can be applied across all services, including data loss prevention (DLP) and threat prevention.

Firewall as a service (FWaaS) provides next-generation firewall features in the cloud computing environment (e.g., also referred to herein as the cloud), thereby removing the need for physical hardware at branch and retail locations. For example, SASE solutions can integrate FWaaS into its cloud-based platform, allowing simplified management and deployment.

Secure web gateways (SWG) can, for example, be implemented to prevent employees and devices from accessing malicious web sites, enforce acceptable use policies before users can access the Internet, and block inappropriate content. As such, a SASE solution can include SWG to protect users no matter their location.

Data loss prevention (DLP) can be implemented to prevent sensitive data from being shared or misused by authorized users and alerts key stakeholders when policies are violated. DLP is generally useful for enterprises that need to maintain compliance with regulations, such as HIPAA, PCI DSS, and/or GDPR. With a SASE solution, DLP tools can be integrated into the cloud platform, eliminating the need for a separate DLP gateway. DLP can be applied inline as well as search data at rest, whether in cloud-based or SaaS-based data storage.

Cloud access security broker (CASB) technology can provide enterprises visibility into where their data resides, enforces enterprise policies for user access, and protects data against unauthorized access. CASBs can also provide a gateway for an enterprise's SaaS provider to the enterprise's employees through cloud-based security policies. As such, SASE solutions can integrate CASB services into a single cloud-based platform to allow enterprises to manage access more easily to their applications (apps) and data.

Further, as organizations grow across different geographical locations, choosing a network becomes a delicate balancing act of cost, performance, and security. A software-defined WAN (SD-WAN) simplifies the management and operation of a wide area network (WAN) by separating the networking hardware (the data plane) from its control mechanism (the control plane). SD-WAN technology allows companies to build higher-performance WANs using lower-cost Internet access. With the adoption of SD-WANs, organizations are increasingly connecting directly to the Internet, introducing security challenges to protect remote networks and mobile users. Additionally, the deployment of Software as a Service (SaaS) applications (e.g., including SASE solutions) has significantly increased, with many organizations directly connecting to such cloud-based SaaS applications, introducing additional networking and security challenges. The adoption of SD-WAN technology introduces many benefits in cost savings and enables organizations to be agile and optimized. However, it also makes branch offices and remote users targets of cyber-attacks and other technical networking and security challenges as similarly described above.

SD-WAN security generally is desired to be as flexible as the networking, but it is also technically challenging to adapt traditional security approaches to such evolving SD-WAN networking in various enterprise network environments such as shown in FIGS. 1A and 1B as will be described below. In a traditional campus network design, there is a full stack of network security appliances at the Internet perimeter that can protect the branch, which is true if all traffic is brought through the core network to pass through such a full stack of network security appliances at the Internet perimeter. However, SD-WANs do not always use this network architecture, such as if the SD-WANs are configured to integrate cloud/SaaS applications.

An alternative to the traditional approach is to deploy network security appliances at the branch office. However, this traditional approach complicates the deployment as it brings the security device/element closer to the branch office.

SD-WAN technology generally uses the principles of software-defined networking (SDN) and separates the control plane and the data plane. Based on this principle, SD-WAN deployments generally include the following components: (1) a controller that administrators use to centrally configure WAN topologies and define traffic path rules; and (2) SD-WAN edge devices (e.g., mobile user (MU) gateways and remote network (RN) gateways), either physical or virtual, that reside at every site and function as the connection and termination points of the SD-WAN fabric.

In an example SD-WAN Type 1 deployment (e.g., branches and headquarters deployment), at each branch site, organizations can deploy one or more SD-WAN edge devices and connect them to form an SD-WAN fabric or SD-WAN overlay. Administrators use the SD-WAN controller, based either in the cloud or on the organization's premises, to manage and configure these edge devices and define the traffic forwarding policies at each site.

Referring to FIG. 1A for an example deployment (e.g., branches, headquarters, and regional data center deployment), the IPSec tunnels are set up between each of the SD-WAN edge devices 102A, 102B, and 102C at each data center (e.g., including IPSec tunnels between the SD-WAN edge device(s) at each branch and headquarters site) and a security service 120 (e.g., a cloud-based security service, such as provided via Prisma Access, which is a commercially available cloud-based security/SASE service from Palo Alto Networks, Inc. headquartered in Santa Clara, CA). This example system diagram is an example deployment for securing traffic from each branch site with one WAN link (Type 1) as shown at 110. SD-WAN Fabric 110 and security service 120 are each in communication with the Internet 140. Security service 120 is in communication with a data store 130 (e.g., a data store for network/security logging data, such as a Cortex™ data lake, which is commercially available from Palo Alto Networks, Inc. headquartered in Santa Clara, CA).

Specifically, this architecture adds SD-WAN devices in regional data centers, along with the SD-WAN devices at each branch and headquarters site. These regional data centers can be public or private cloud environments. SD-WAN devices at the regional data center aggregate network traffic for smaller sites in that region. For example, organizations can use this deployment when there are multiple regional branch sites with lower bandwidth connections to the Internet.

Referring to FIG. 1B, for another example deployment (e.g., branches, headquarters, and regional data center), the IPSec tunnels are set up between the SD-WAN edge device at each data center (e.g., including at SD-WAN devices 102D and 102E) and a security service 120 (e.g., a cloud-based security/SASE service, such as provided via Prisma Access, which is a commercially available cloud-based security service from Palo Alto Networks, Inc. headquartered in Santa Clara, CA). This example system diagram is an example deployment for securing SD-WAN deployments with Regional Hub/POP architectures. As shown, the IPSec tunnels are set up between each of the regional data centers or hubs 106A and 106B and the security service 120.

A common network architecture today is to tunnel traffic between an enterprise's headquarters and branches over either MPLS links or dedicated encrypted VPN links. As more services are cloud-based (e.g., including SaaS solutions, such as Microsoft Office 365®, Salesforce®, etc.), and more information is available on the Internet, it generally makes less sense to tunnel traffic back to an aggregation point before routing it to its final destination. Breaking out traffic locally from the branches (e.g., as opposed to an on-premises appliance) generally allows traffic to reach its destination faster and makes a more efficient use of bandwidth. However, allowing traffic directly between devices in the branch and the Internet also introduces new networking and technical security challenges with respect to effectively and efficiently providing private application access for these connectivity solutions as similarly described above.

As such, the disclosed techniques for wildcard based private application access (e.g., for a SASE environment) can be performed in these example SD-WAN architectures and a security service/SASE environment as will be further described below with respect to various embodiments.

Figure 2:
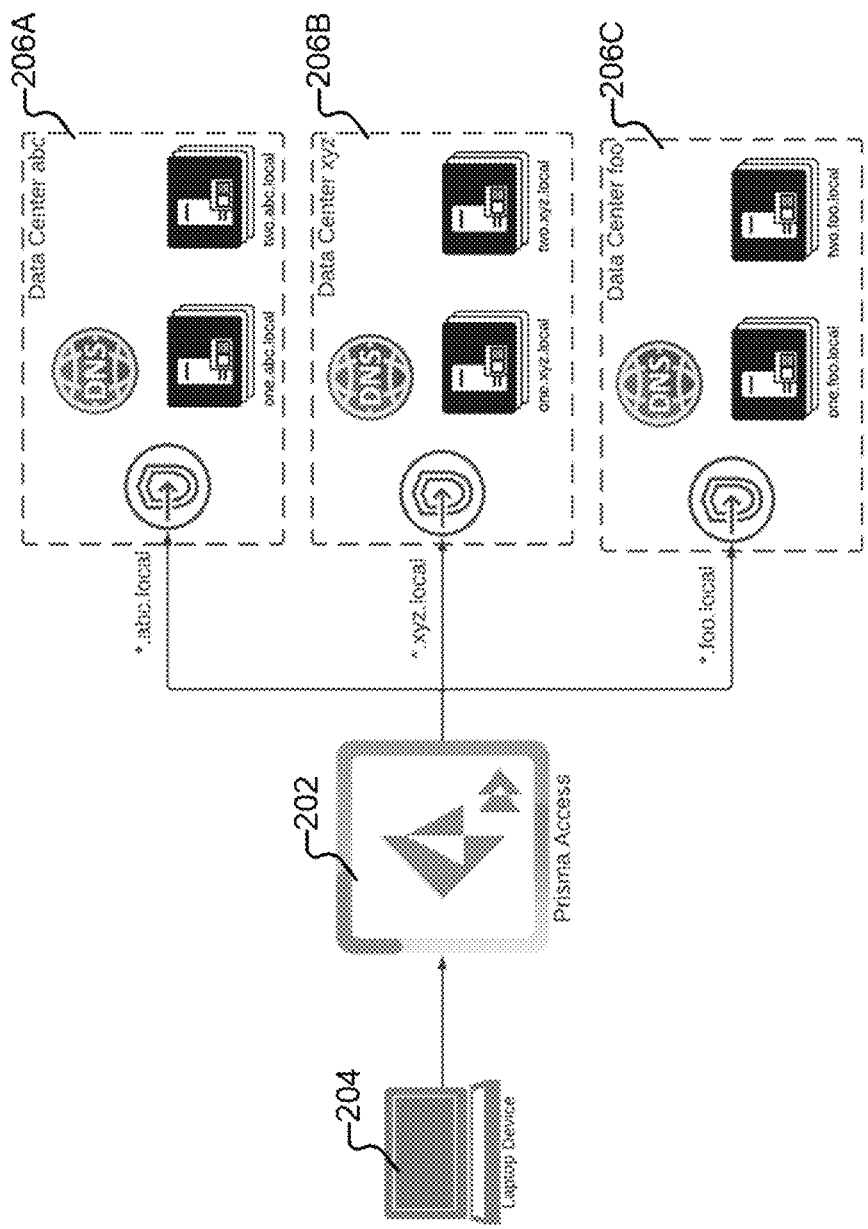
FIG. 2 is an example system diagram of a Secure Access Service Edge (SASE) environment that provides wildcard based private application access in accordance with some embodiments.

FIG. 2 is an example system diagram of a Secure Access Service Edge (SASE) environment that provides wildcard based private application access in accordance with some embodiments. Specifically, FIG. 2 illustrates providing wildcard fully qualified domain name (FQDN) DNS resolution to a single data center.

Referring to FIG. 2, a user via their endpoint device, such as a laptop device as shown at 204 (e.g., or another network enabled communication device), is provided access to various enterprise data centers 206A, 206B, and 206C via a SASE solution, shown as Prisma Access 202. In this example implementation, a user (e.g., an IT/network/security admin) defines wildcard based domains in a group, such as follows: *.abc.local reachable via group-abc for accessing applications executing in data center abc as shown at 206A, *.xyz.local reachable via group-abc for accessing applications executing in data center xyz as shown at 206B, and *.foo.local reachable via group-foo for accessing applications executing in data center foo as shown at 206C.

Specifically, in this example implementation, when connectors are onboarded, a SASE microservice (e.g., a ZTNA microservice, such as further described below with respect to FIG. 3) automatically generates a DNS Proxy configuration for, for example, *.abc.local and configures the Loopback IP of the connectors as the name servers/relays to forward the DNS requests to, on the mobile user (MU)/remote network (RN) gateway (GW) (e.g., through a SaaS Agent). As such, when a request arrives for 1.abc.local on the MU GW, the DNS Proxy forwards the request to the configured nameservers/relays. The DNS request arrives on the connector's Loopback address on port 53, which attempts to resolve the FQDN. If there is no result, then the request is silently dropped. If there is a result, the connector (e.g., a ZTNA connector, such as further described below with respect to FIG. 3) sends a notification to a cloud controller (e.g., a CGNX Controller, such as further described below with respect to FIG. 3), which specifies the IP address. The cloud controller then sends a notification to the SASE microservice. The SASE microservice, after receiving the notification, then creates an application by assigning an IP to the FQDN (if not already done) (e.g., and the SASE microservice is also onboard the application on the connectors onto the group, such as further described below). The SASE microservice then creates a DNS Proxy static entry as well as the network address translation (NAT) rules for the application. The MU/RN GW after that field the DNS request from its DNS Proxy cache, so that no more request is generated for that FQDN to the connector.

Application Discovery for Wildcard Based Application Access

In some embodiments, the disclosed techniques also include providing automated application discovery for wildcard based application access. For example, an admin can specify multiple ports or a port range (e.g., 1-64 k) to the wildcard specification during configuration to facilitate such automated application discovery for wildcard based application access to various applications in each of the enterprise data centers, such as for data centers 206A-C as shown in FIG. 2. Specifically, in this example implementation, application discovery can be performed by probing and/or automated analysis of flow records to facilitate enhanced automated discovery of available applications and ports (e.g., available applications and other open ports, such as open/listening TCP ports) for such supported applications for the enterprise.

Figure 3:
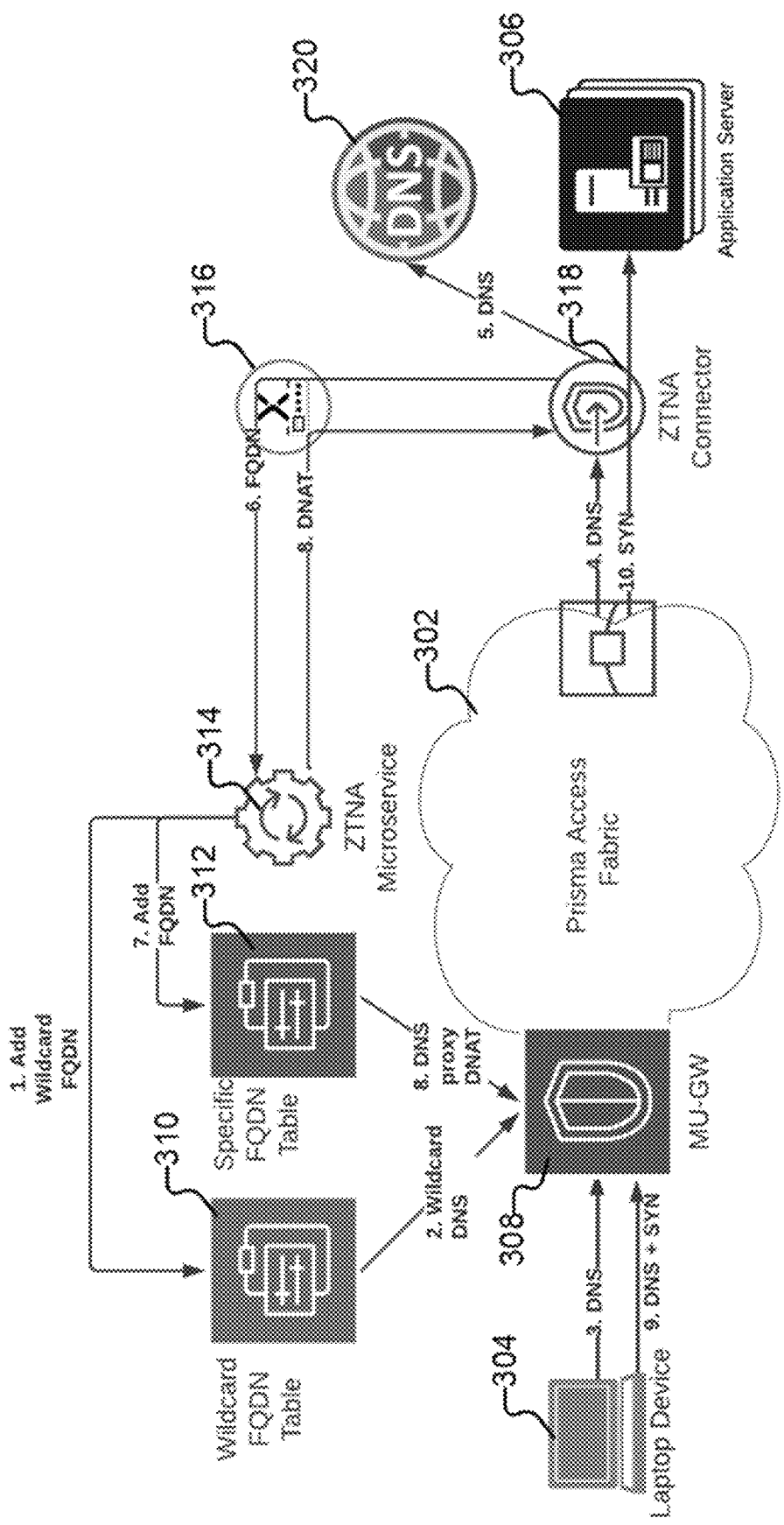
FIG. 3 is an example system diagram of a Secure Access Service Edge (SASE) environment that illustrates a wildcard FQDN DNS resolution procedure in accordance with some embodiments.

In this example implementation, once the DNS is resolved, application probes are configured on the connector (e.g., ZTNA connectors, such as shown in FIG. 3). The configured application probes can periodically scan the Host/s for TCP pings on the configured/defined ports and/or port ranges. The Host Keep Alive (e.g., scanning for Internet Control Message Protocol (ICMP) packets) is also instantiated. As such, multiple applications (e.g., HTTP, HTTPS, SSH, etc.) can be automatically detected and automatically configured (and/or suggested for configuration to the admin) for wildcard based application access, as similarly described above with respect to FIG. 2, to reduce the port range to secure server access. As another example, automated application discovery for wildcard based application access to various applications in each of the enterprise data centers can also be automatically learned from using the traffic initiated from users towards a given host to identify the different applications using an L7 engine executed on the MU/RN GW and presenting the applications for audit for access (e.g., to suggest for adding for wildcard access by the admin).

As such, the disclosed techniques for using application discovery to enhance the disclosed techniques for wildcard based application access can effectively and efficiently facilitate application discovery through the connectors versus constant control plane based session stitching L4-based application sharding (e.g., rather than just using DNS-based application placement).

FIG. 3 is an example system diagram of a Secure Access Service Edge (SASE) environment that illustrates a wildcard FQDN DNS resolution procedure in accordance with some embodiments. Specifically, FIG. 3 illustrates an example cloud computing architecture and processing flow for a wildcard FQDN DNS resolution procedure for a SASE environment to facilitate wildcard based private application access.

In an example implementation, the disclosed techniques for providing wildcard based private application access for a SASE environment facilitates an effective and efficient solution to instantiate the onboarding of specific FQDN applications for an enterprise (e.g., a corporate, government, educational, and/or any other organization) based on end user DNS requests. As the end user initiates the DNS requests, the specific FQDN applications are onboarded automatically without administrator action needed. The initiation of a new DNS request that matches the wildcard FQDN is the functional equivalent of the IT/network/security administrator(s) (admin(s)) adding the application in a management console UI, thereby reducing the labor intensive and error prone task that would otherwise typically be performed by the admin(s) for the enterprise.

Referring to FIG. 3, a user via their endpoint device, such as a laptop device as shown at 304 (e.g., or another network enabled communication device), is provided access to an enterprise (private) application(s) via a SASE solution, shown as Prisma Access 302.

In an example implementation, a processing flow for a wildcard FQDN DNS resolution procedure for a SASE environment to facilitate wildcard based private application access will now be described with respect to FIG. 3. Specifically, the learning of a new specific FQDN application (e.g., confluence.ACME.com or perforce.ACME.com, etc.) takes the following procedure to be onboarded and will now be described with respect to FIG. 3.

Referring to FIG. 3, an admin (e.g., as shown at 404 in FIG. 4) for the enterprise adds a configuration for a wildcard FQDN as shown at a first stage, which can be stored in a wildcard FQDN table 310 using a ZTNA microservice 314.

As shown at a second stage, the wildcard FQDN is added by the ZTNA microservice to a mobile user (MU) gateway (GW) shown as MU-GW 308.

At a third stage, an end user sends a DNS request from their endpoint device, shown as laptop device 304, to a specific FQDN. MU-GW 308 executes a DNS resolver to determine what wildcard rule (if any) matches the DNS request.

At a fourth stage, MU-GW 308 sends the DNS request via a SASE fabric, shown as a Prisma Access fabric 302, to a ZTNA connector 318 (e.g., an instance in the connector group for the Prisma Access/SASE solution, which can be implemented as a container of such connectors executing in a cloud computing environment, such as GCP). In this example implementation, ZTNA connector 318 is in secure communication (e.g., via an IPSEC tunnel) with Prisma Access fabric 302.

At a fifth stage, ZTNA connector 318 forwards the DNS request to a data center DNS server 320. In this example implementation, DNS server 320 can be configured via DHCP on a data center interface. The data center DNS Server resolves the specific FQDN and then sends a DNS reply back to ZTNA connector 318 (e.g., as such, the ZTNA connectors can execute a data path element service for this example implementation of the SASE solution that facilitates wildcard based private application access).

At a sixth stage, ZTNA connector 318 automatically notifies a cloud controller 316 (e.g., implemented in this example using a commercially available cloud-based controller for controlling ZTNA Connector(s) as well as SD-WANs, etc., such as using the commercially available CloudGenix (CGNX) controller or another commercially available cloud controller can be similarly used) that a DNS request initiated by an end user has been resolved. As also shown, cloud controller 316 then forwards this notification to ZTNA microservice 314 (e.g., the ZTNA microservice can be executed in the cloud, such as using the Google Cloud Platform (GCP) or another commercially available cloud computing service can similarly be used for implementing the disclosed cloud-based SASE solution).

At a seventh stage, ZTNA microservice 314 automatically identifies the most specific wildcard FQDN match and then automatically adds the specific FQDN application with the same matching protocol and port specification to a specific FQDN table 312. As such, this application add is the functional equivalent of an administrator adding the specific FQDN application with the wildcard FQDN application protocol (e.g., example application protocols can include TCP, UDP, etc.) and port specification along with health monitoring.

At an eighth stage, the DNS proxy DNAT is provided from specific FQDN table 312 to MU-GW 308. In this example implementation, the ZTNA Microservice addition of a specific application can be implemented using the following example standard procedure. First, add a virtual IP address (VIP) for application server 306 (e.g. Prisma Access IP address for accessing the Application Server) to MU-GW 308 along with a DNAT rule (e.g., for translation of the VIP to the private/local IP address associated with application server 306 in the data center for the enterprise, and ZTNA connecter 318 periodically updates its mapping, such as if the local IP address server changes or if load balancing for multiple local IP addresses associated with the application server, which can be provided on a session-based load balancing allocation). Second, add the application via an application programming interface (API) (e.g., using a cloud controller/CloudGenix (CGNX) composite API). In this example implementation, one Prisma Access fabric IP address is allocated that is the application VIP to get the data to go to the MU. Another PA Fabric IP address is used for routing the data to the connector. As such, the MU DNAT rule statically DNATs the Dest IP from the VIP address to the connector IP for that specific application. At the connector, another DNAT rule is used that matches the connector IP for that specific application. The DNAT rule match action is to then DNAT from the Prisma Access fabric IP for that application to the local data center IP address(es). The data center IP routing and the Prisma Access IP routing are kept separated to ease the network design for the deployment. If the same FQDN has multiple individual ports, such as for SSH/HTTP/HTTPS, then each individual application can have its own individual connector IP with individual DNAT rules at the MU and the connector. In some deployments, a given enterprise admin may not desire to separate them and then can just have an aggregate application for TCP or UDP to the FQDN with ports wide open to include all ports.

At a ninth stage, end user device 304 resends the DNS request (e.g., DNS and SYN packets) for the same specific FQDN, and MU-GW 308 responds with the application VIP. The end user device then sends the first application packet, and MU-GW 308 selects a ZTNA connector in the group.

At a tenth stage, ZTNA connector 318 receives the first packet and automatically performs a network address translation (NAT) of the packet to application server 306 to initiate the connection between end user device 304 and application server 306.

In this example implementation, different DNS servers can be specified for different wildcards or types of wildcards. If there is no wildcard match, then a default DNS resolver protocol can be performed. As such, there is a hierarchy of DNS server matches (e.g., to cloud and/or data center located DNS servers).

In this example implementation, the learned FQDNs can be replicated across all MU GWs for the enterprise, and similarly, for remote node (RN) gateways for the enterprise (e.g., for providing access to remote networks, such as for branch offices, for the enterprise).

As such, the above-described example implementation provides an automated solution that is equivalent to an admin having to manually configure the FQDN when adding a supported application for the enterprise.

As another example, the wildcards can be available across multiple data centers, and the configuration can be automatically determined to match the appropriate application in the desired data center (e.g., regionally route a remote user to the nearest data center with the application, such as users in the US are mapped to the matching application for the wildcard in the US data center, whereas users in Asia are mapped to the matching application for the wildcard in the Asia data center, etc., and/or for load balancing, select data center options based on load balancing, etc.).

After the above procedure has been completed for a particular FQDN application, the admin(s) for the enterprise can view the learned application in, for example, a management console user interface (UI). In this example implementation, the admin(s) can view learned application attributes, such as the following: (1) matching wildcard application indicating this application was learned via DNS wildcard; (2) onboarding time by viewing a wildcard apps onboarding log; and (3) various other application attributes, such as Cortex Data Lake (CDL) (e.g., CDL flow records that include individual session source and destination IP addresses, protocol, and source and destination ports; the flow records can include both pre-NAT, such as for the Prisma Access routing domain, and post-NAT, such as for the data center routing domain, for addresses and ports; as such, it is from here that the specific protocol and port(s) can be derived) and various application statistics.

In some cases, the learned applications may be an application (app) that the admin(s) for the enterprise does not want to allow the end user to access. In this scenario, the admin(s) can add the FQDN to security policies enforced by MU-GW 308 and then delete the learned app. If the same FQDN is resolved, the app will be relearned by the above-described wildcard based private application access solution.

After all the specific FQDNs have been learned over a period of weeks or months, the admin(s) can delete the wildcard application. In this example implementation, the applications learned from the wildcard will remain unless individually deleted.

In example implementations, various further optimizations can be provided for having the MU-GW automatically determine the protocol and port (e.g., such that this meta information does not have to be pre-configured in the wildcard by the admin). Various example optimizations will now be described below.

First, an application probe of the resolved DNS IP address can be used to detect which ports are open for applications listening for sessions. A particular resolved FQDN may have several ports listening (e.g., SSH, HTTP, HTTPS, etc.) and each listening port will be a separate application.

Second, after the FQDN and VIP as well as a connector IP for the application are determined, the ports and protocol can be left wide open in the DNAT rules. Then, when the first data packet comes in that includes protocol and destination port information, we report that back from the connector to the controller to microservice to fine grain tune the specific application. As such, if the same FQDN had SSH/HTTP/HTTPS, then we would have one general rule and as packets came in for the three specific apps, we would create additional specific protocol/port apps (see, e.g., FIG. 5 as shown at stages 11 and 12, and after those stages, the specific DNAT rules can then be added to the MU-GW and the ZTNA Connector).

Third, instead of extracting the protocol and port from the first packet as discussed above in the second example optimization, the connector can report flow records to the CDL and glean the information from there. The only difference here is that delivery method in the second optimization technique does it directly from the connector to the controller to the microservice. But the connector can also just dump its normal flow record stats, and we can have a process that closes the loop by requesting/extracting that information from the CDL.

Figure 4:
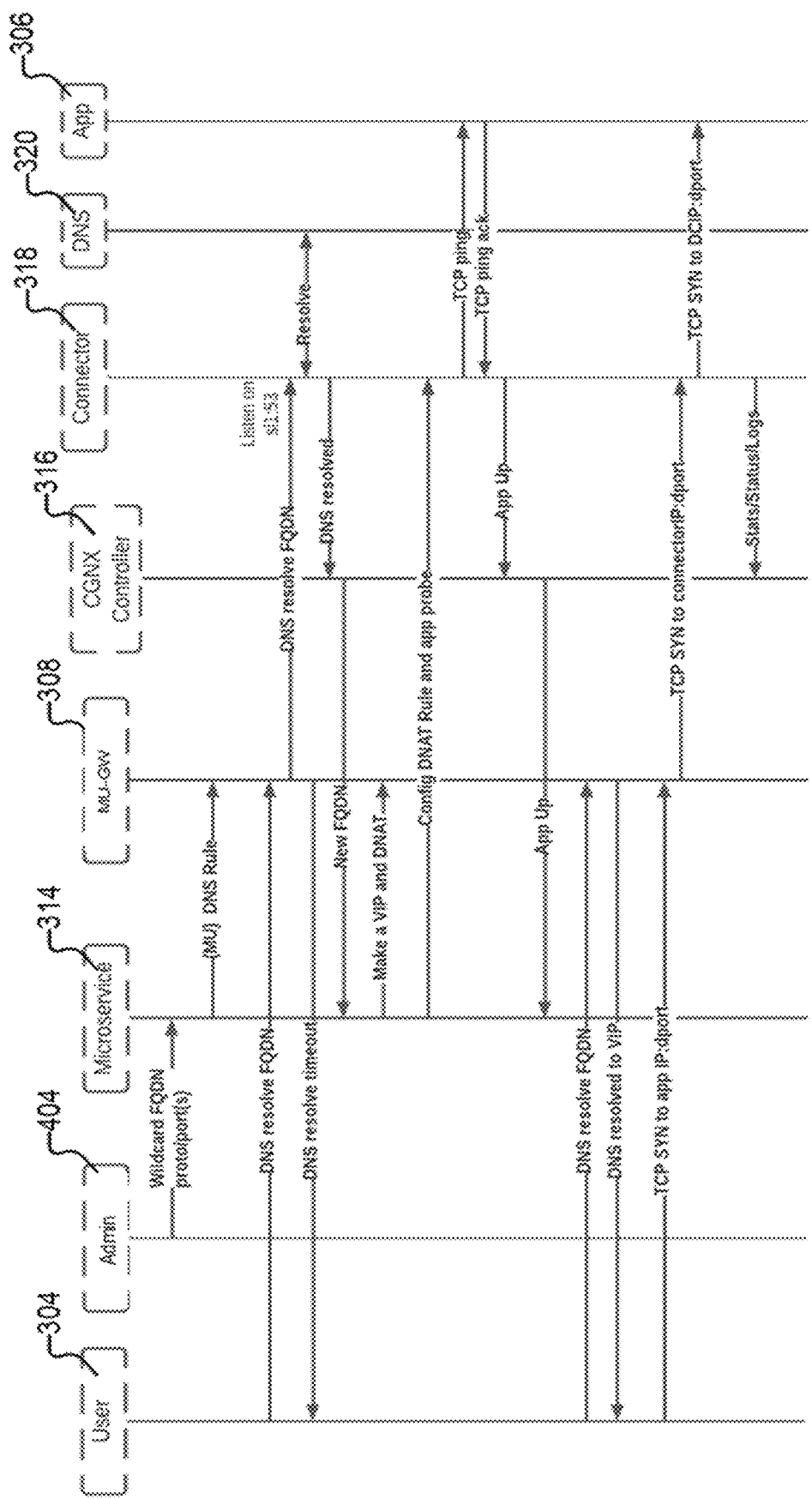
FIG. 4 is a sequence diagram illustrating the processing for performing a wildcard FQDN DNS resolution in accordance with some embodiments.

FIG. 4 is a sequence diagram illustrating the processing for performing a wildcard FQDN DNS resolution in accordance with some embodiments. Specifically, FIG. 4 illustrates an example sequence diagram for a wildcard FQDN DNS resolution procedure for a SASE environment to facilitate wildcard based private application access. More specifically, the sequence diagram includes user 304, microservice (e.g., ZTNA microservice) 314, MU-GW 308, controller (e.g., CGNX controller) 316, connector (e.g., ZTNA connector) 318, DNS server 320, and an app (e.g., executed on an application server 306) as similarly shown and described above with respect to FIG. 3, as well as an enterprise admin 404 (e.g., which as shown in FIG. 4, initially configures wildcard FQDN protocol(s)/port(s), such as similarly described above).

Figure 5:
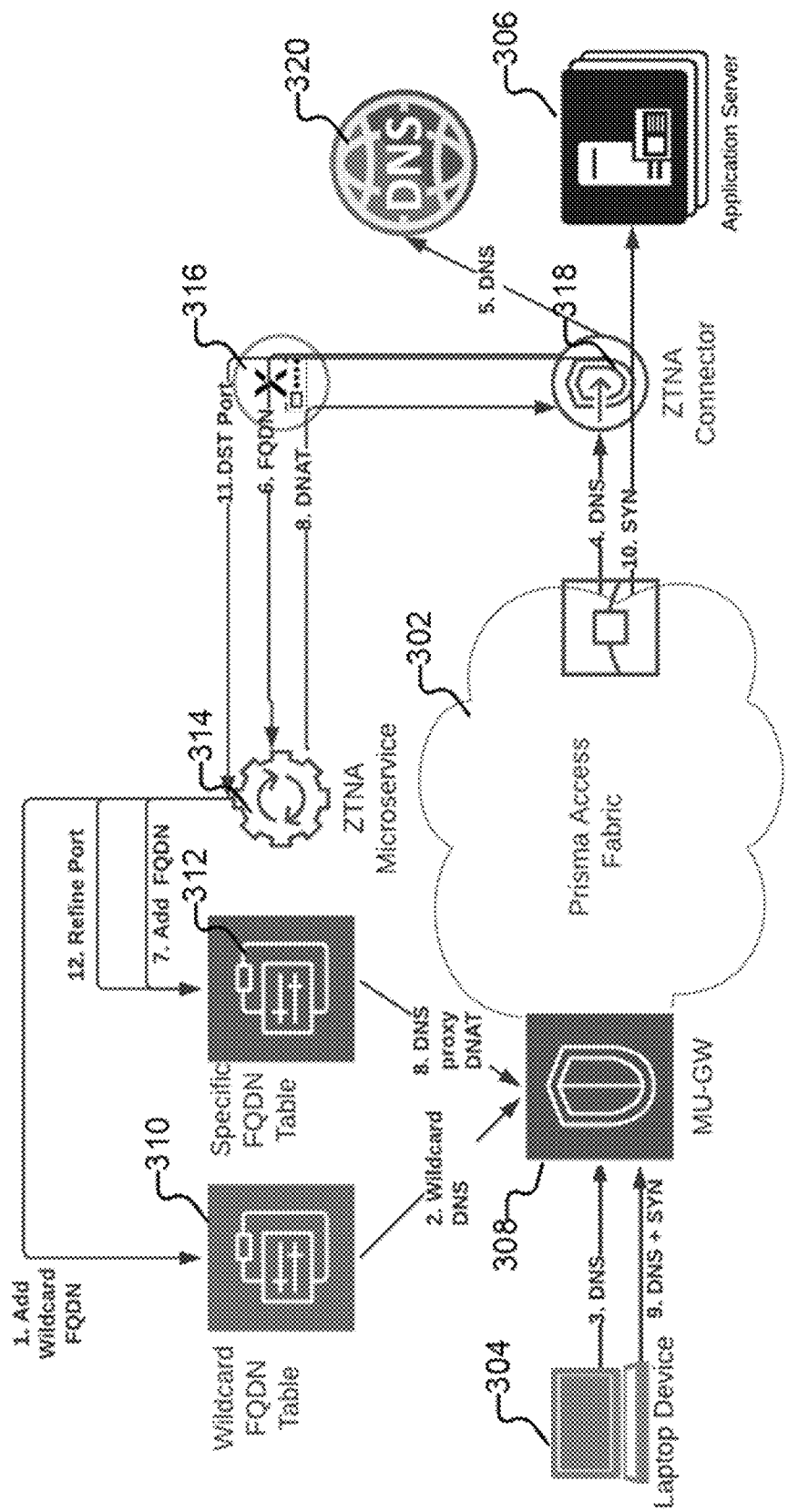
FIG. 5 is an example system diagram of a Secure Access Service Edge (SASE) environment that illustrates a wildcard FQDN DNS resolution procedure in accordance with some embodiments.

FIG. 5 is an example system diagram of a Secure Access Service Edge (SASE) environment that illustrates a wildcard FQDN DNS resolution procedure in accordance with some embodiments. Specifically, FIG. 5 illustrates an example cloud computing architecture and processing flow for a wildcard FQDN DNS resolution procedure for a SASE environment to facilitate wildcard based private application access.

In an example implementation, a processing flow for a wildcard FQDN DNS resolution procedure for a SASE environment to facilitate wildcard based private application access is similar to the above-described processing flow with respect to FIG. 3 except for the addition processing stages for providing the destination port as will now be described. Specifically, as shown at stage 11 of FIG. 5, controller 316 returns a destination (DST) port for the matching FQDN application to ZTNA microservice 314. At stage 12, the port is added to the entry for the matching FQDN application in specific FQDN table 312 as shown in FIG. 5.

Figure 6:
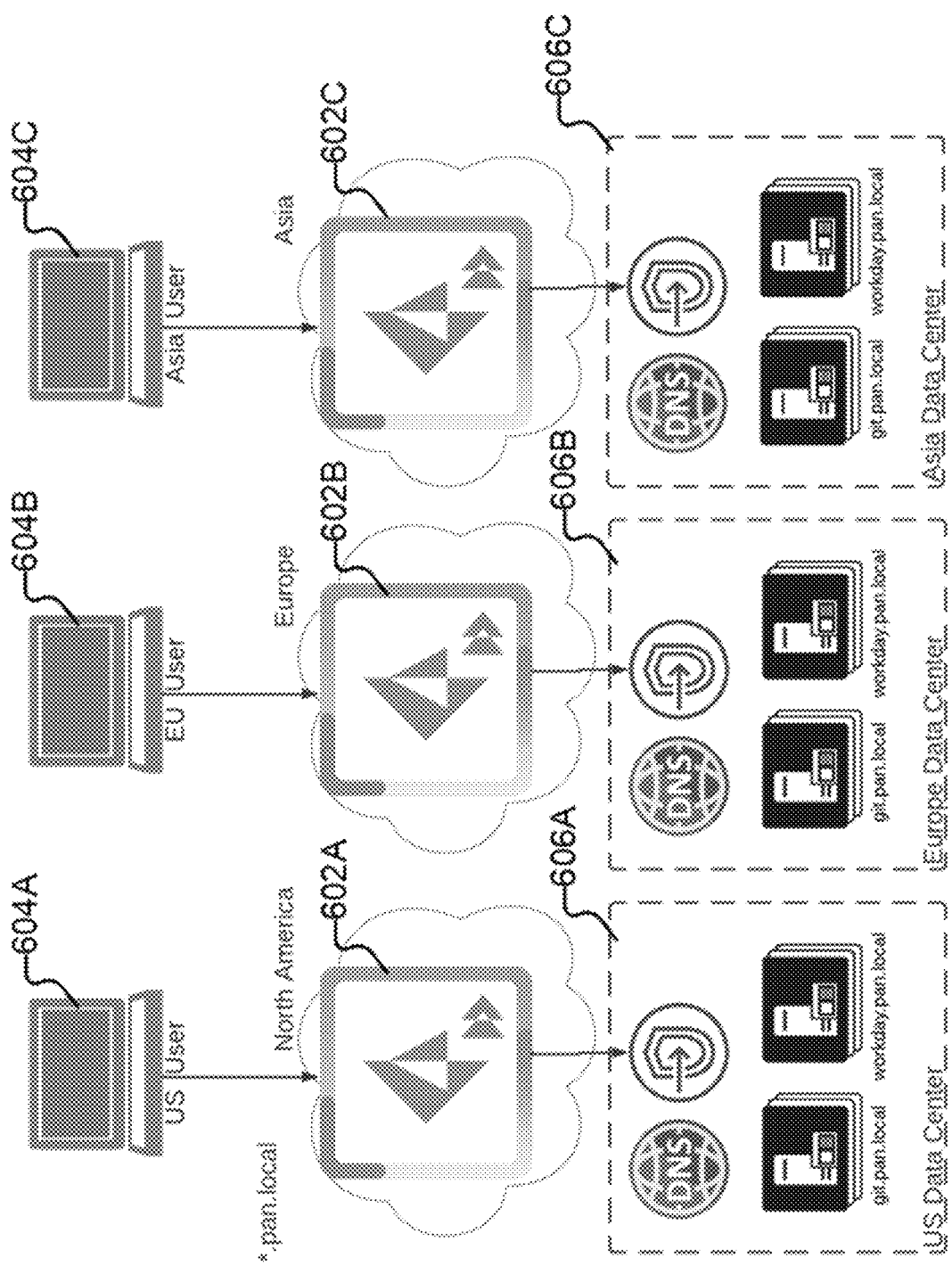
FIG. 6 is an example system diagram of a Secure Access Service Edge (SASE) environment that illustrates a wildcard FQDN DNS resolution regional data center in accordance with some embodiments.

FIG. 6 is an example system diagram of a Secure Access Service Edge (SASE) environment that illustrates a wildcard FQDN DNS resolution regional data center in accordance with some embodiments. Specifically, FIG. 6 illustrates an example cloud computing architecture for a wildcard FQDN DNS resolution regional data center for a SASE environment to facilitate wildcard based private application access.

Referring to FIG. 6, users/devices associated with the enterprise, including a United States (US) located user 604A, a Europe (EU) located user 604B, and an Asia located user 604C, are provided access to private applications, such as the Workday application, executing in various enterprise data centers including US data center 606A, Europe data center 606B, and Asia data center 606C via a SASE solution, shown as Prisma Access 602A, 602B, and 602C, respectively.

In this example implementation, the wildcards can be available across multiple data centers, and the configuration can be automatically determined to match the appropriate application in the desired data center (e.g., regionally route a remote user to the nearest data center with the application (e.g., for workday.pan.local), such as users in the US are mapped to the matching application for the wildcard in the US data center, whereas users in Asia are mapped to the matching application for the wildcard in the Asia data center, etc., and/or for load balancing, select data center options based on load balancing, etc.). In an example implementation, this can similarly be implemented by creating a routing table across the globe with the same app IP being advertised by the individual data centers. If you are in the US user in the US, the routing cost metric will be lowest to the US data center. If a US user flies to Sweden and logs into a Sweden gateway, then the US user will go to the European data center. As such, a similar mapping/routing technique can be applied for disaster recovery (e.g., a lower cost to the active data center, a higher routing cost to the backup data center, such that if the active data center is down, then routing naturally sends users to the backup data center).

Figure 7:
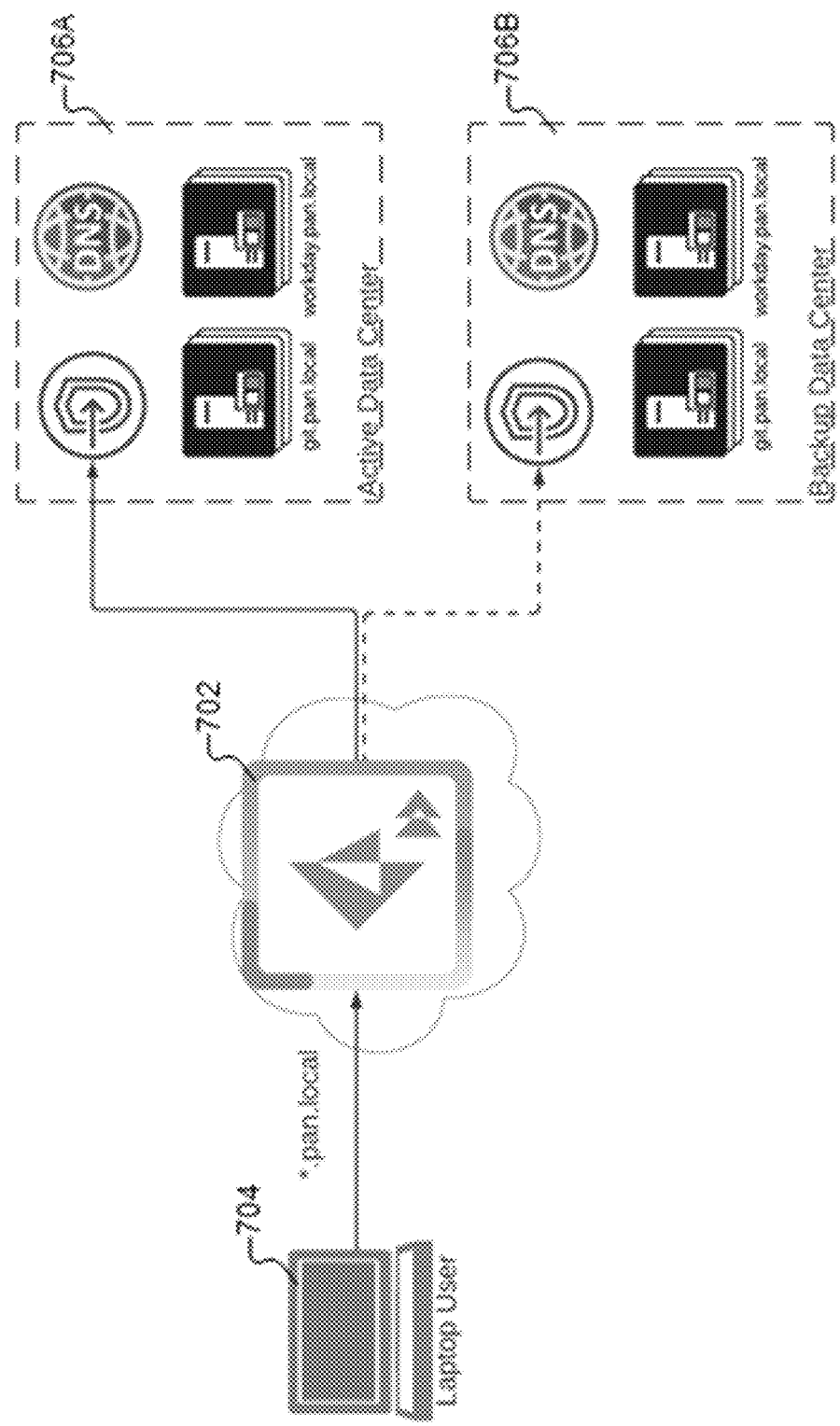
FIG. 7 is an example system diagram of a Secure Access Service Edge (SASE) environment that illustrates a wildcard FQDN DNS resolution disaster recovery in accordance with some embodiments.

FIG. 7 is an example system diagram of a Secure Access Service Edge (SASE) environment that illustrates a wildcard FQDN DNS resolution disaster recovery in accordance with some embodiments. Specifically, FIG. 7 illustrates an example cloud computing architecture for a wildcard FQDN DNS resolution disaster recovery for a SASE environment to facilitate wildcard based private application access.

Referring to FIG. 7, a user/device associated with the enterprise shown at 704 is provided access to private applications, such as the Workday application, executing in various enterprise data centers including an active data center 706A and a backup data center 706B via a SASE solution, shown as Prisma Access 702.

In this example implementation, the wildcards can be available across multiple data centers, and the configuration can be automatically determined to match the appropriate application in the available data center (e.g., route a remote user to the active data center with the application (e.g., for workday.pan.local), whereas users are mapped to the backup data center if/when the active data center goes down or is unreachable, etc.).

Figure 8A:
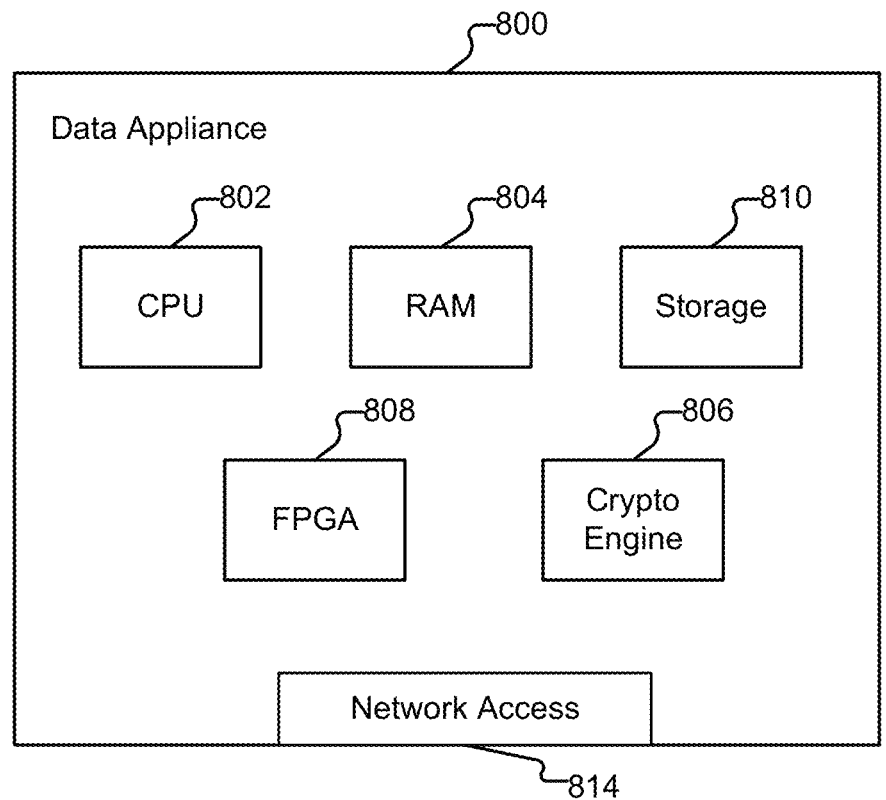
FIG. 8A illustrates an embodiment of a network gateway in accordance with some embodiments.

An embodiment of a network gateway 800 is shown in FIG. 8A (e.g., such as network gateways/SD-WAN edge devices shown at 102A-C in FIGS. 1A-1B). The example shown is a representation of physical components that can be included in network gateways/SD-WAN edge devices shown at 102A-C in FIGS. 1A-1B if the network gateway is implemented as a data appliance, in various embodiments. Specifically, the data appliance includes a high-performance multi-core Central Processing Unit (CPU) 802 and Random Access Memory (RAM) 804. The data appliance also includes a storage 810 (e.g., one or more hard disks or solid-state storage units). In various embodiments, the data appliance stores (e.g., whether in RAM 804, storage 810, and/or other appropriate locations) information that is used in monitoring an enterprise network and implementing the disclosed techniques, such as for SD-WAN path selection as similarly described above with respect to FIGS. 1A-7. Examples of such information can also include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 806 configured to perform encryption and decryption operations, and one or more Field Programmable Gate Arrays (FPGAs) 808 configured to perform matching, act as network processors, and/or perform other tasks. The data appliance also includes a network access 814.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; Microsoft Office 365 related traffic; and so on.

The disclosed system processing architecture can be used with distinct types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 8B:
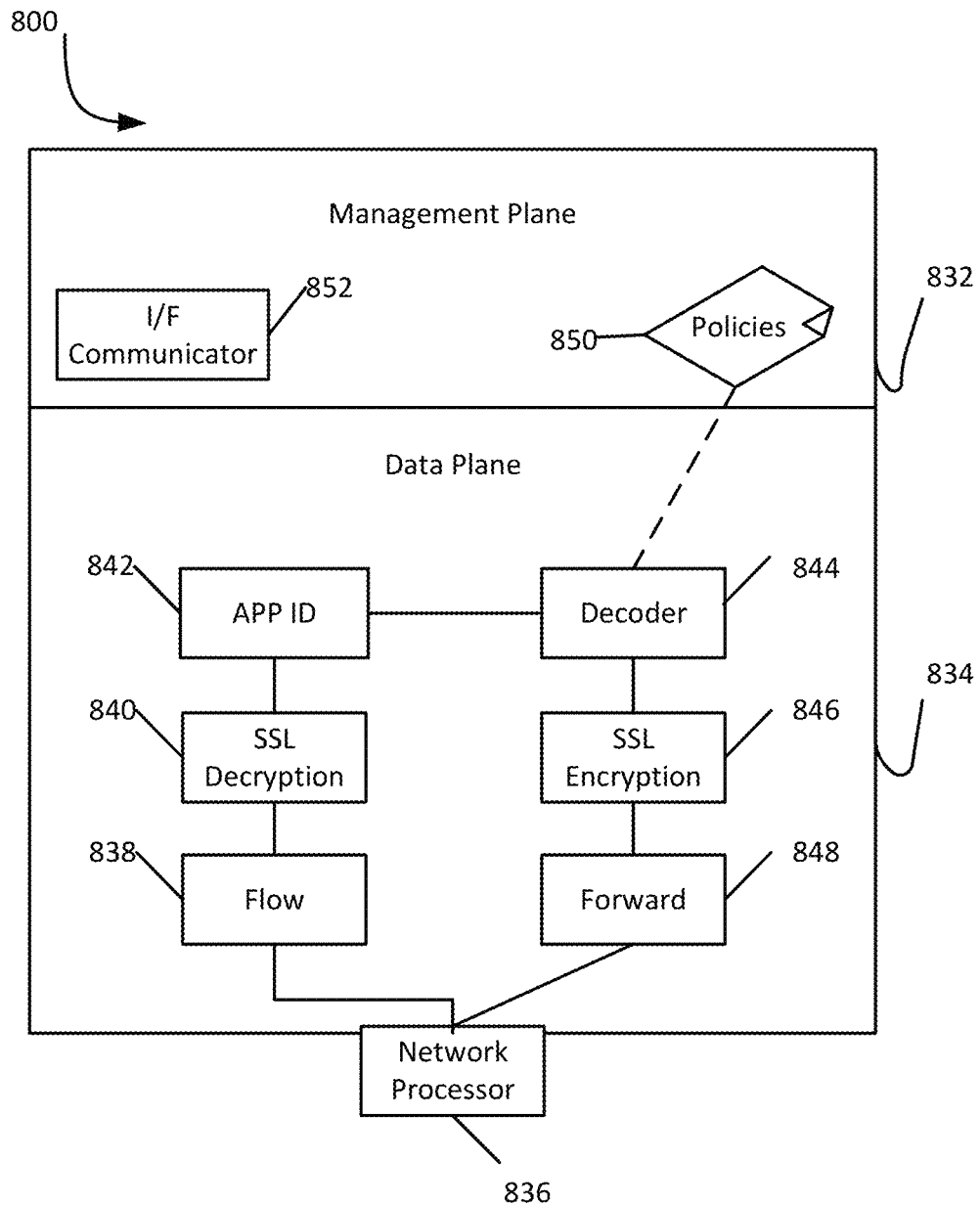
FIG. 8B is a functional diagram of logical components of an embodiment of a data appliance.

FIG. 8B is a functional diagram of logical components of an embodiment of a data appliance. The example shown is a representation of logical components that can be included in network gateway 800 in various embodiments (e.g., such as network gateways/SD-WAN edge devices shown at 102A-C in FIGS. 1A-1B). Unless otherwise specified, various logical components of network gateway 800 are generally implementable in a variety of ways, including as a set of one or more scripts (e.g., written in Go, Java, Python, etc., as applicable).

As shown, network gateway 800 comprises a firewall, and includes a management plane 832 and a data plane 834. The management plane is responsible for managing user interactions, such as by providing a user interface for configuring policies and viewing log data. The data plane is responsible for managing data, such as by performing packet processing and session handling.

Network processor 836 is configured to receive packets from various client devices (e.g., such as client devices at branch/remote offices), and provide them to data plane 834 for processing. Whenever flow module 838 identifies packets as being part of a new session, it creates a new session flow. Subsequent packets will be identified as belonging to the session based on a flow lookup. If applicable, SSL decryption is applied by SSL decryption engine 840. Otherwise, processing by SSL decryption engine 840 is omitted. Decryption engine 840 can help network gateway 800 inspect and control SSL/TLS and SSH encrypted traffic, and thus help to stop threats that might otherwise remain hidden in encrypted traffic. Decryption engine 840 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control distinct options for sessions controlled by the policy. For example, the use of specific cipher suites and encryption protocol versions can be required.

Application identification (APP-ID) engine 842 is configured to determine what type of traffic a session involves. As one example, application identification engine 842 can recognize a GET request in received data and conclude that the session requires an HTTP decoder. In some cases, e.g., a web browsing session, the identified application can change, and such changes will be noted by network gateway 800. For example, a user may initially browse to a corporate Wiki (classified based on the URL visited as "Web Browsing-Productivity") and then subsequently browse to a social networking site (classified based on the URL visited as "Web Browsing-Social Networking"). Distinct types of protocols have corresponding decoders.

Based on the determination made by application identification engine 842, the packets are sent, by decoder 844, to an appropriate decoder configured to assemble packets (e.g., which may be received out of order) into the correct order, perform tokenization, and extract out information. Decoder 844 also performs signature matching to determine what should happen to the packet. As needed, SSL encryption engine 846 can re-encrypt decrypted data. Packets are forwarded using a forward module 848 for transmission (e.g., to a destination).

As also shown in FIG. 8B, policies 850 are received and stored in management plane 832. Policies 850 can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. As another example, policies 550 can include various SD-WAN path selection policies/rules, such as similarly described above with respect to FIGS. 1A-7. An interface (I/F) communicator 852 is provided for management communications (e.g., via (REST) APIs or other communication mechanisms).

Example process embodiments for wildcard based private application access (e.g., for a SASE environment) will now be described below.

Example Process Embodiments for Wildcard Based Private Application Access

Figure 9:
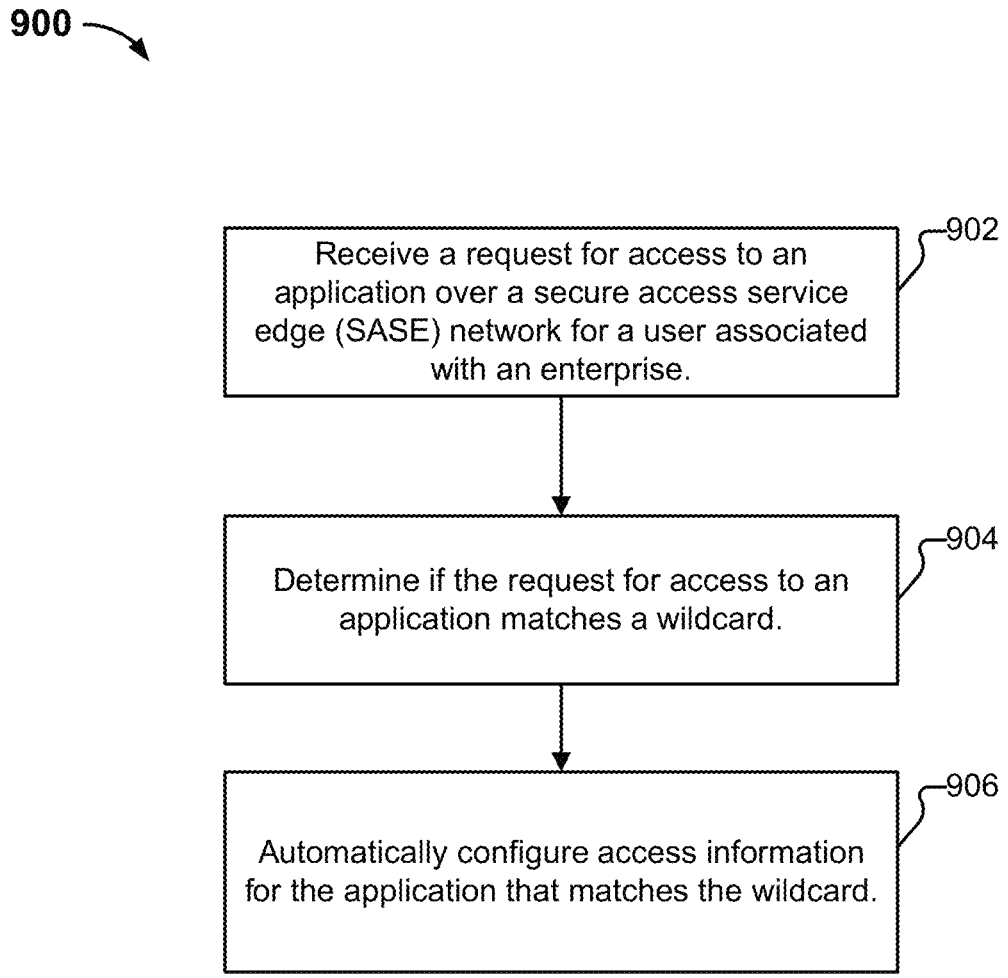
FIG. 9 is a flow diagram illustrating a process for wildcard based private application access in accordance with some embodiments.

FIG. 9 is a flow diagram illustrating a process for wildcard based private application access in accordance with some embodiments. In one embodiment, process 900 is performed using the system architectures described above (e.g., such as described above with respect to FIGS. 1A-8B).

The process begins at 902 where a request for access to an application over a secure access service edge (SASE) network for a user associated with an enterprise is received. For example, the SASE can be a cloud-based security service, such as similarly described above with respect to FIGS. 1A-1B.

At 904, whether the request for access to an application matches a wildcard is determined. For example, the wildcard can be configured by an administrator of the enterprise for matching a fully qualified domain name (FQDN) for the application, such as similarly described above with respect to FIGS. 2-4.

At 906, automatically configuring access information for the application that matches the wildcard is performed. For example, the access information for the application can include an IP address, a protocol, and a destination port, such as similarly described above with respect to FIGS. 2-5.

Figure 10:
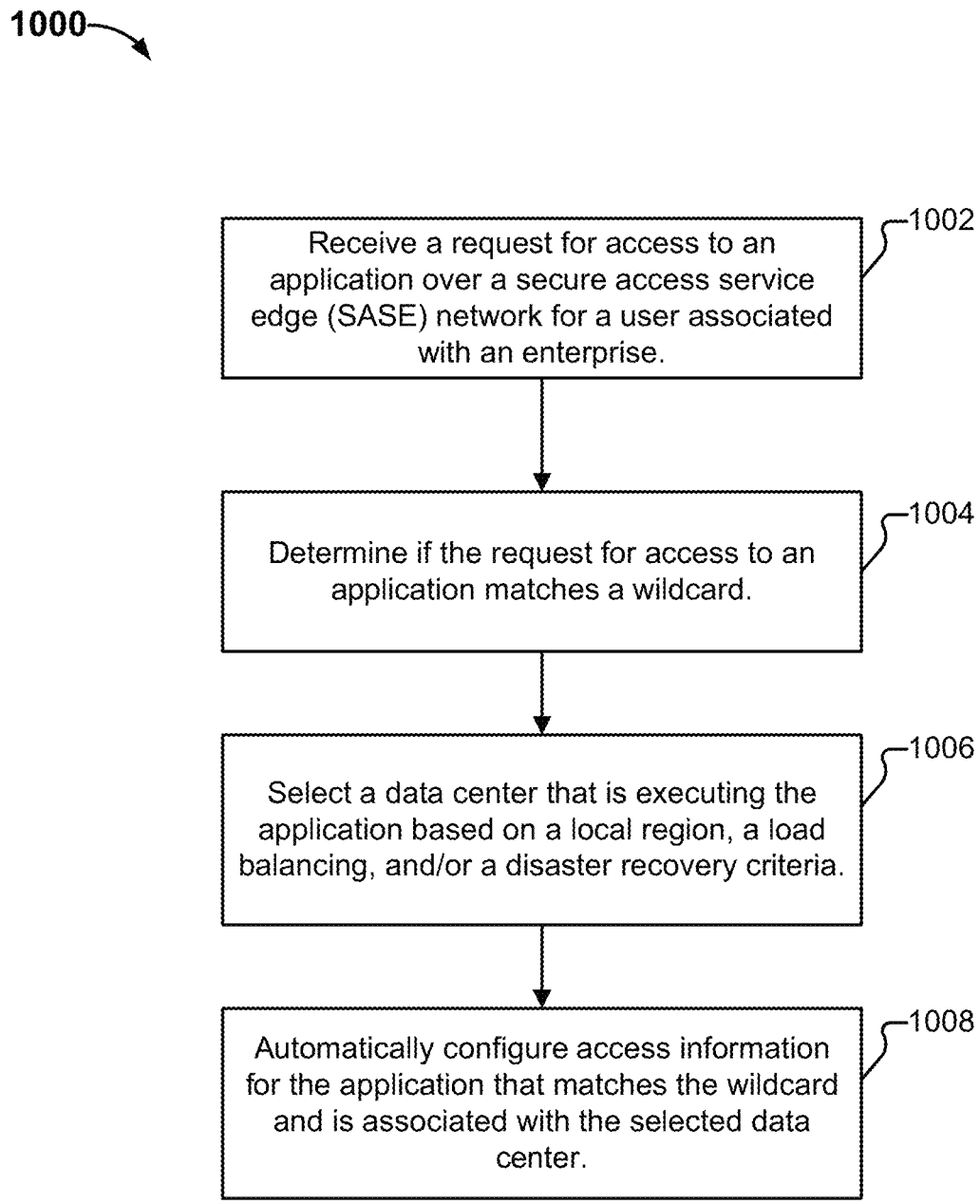
FIG. 10 is another flow diagram illustrating a process for wildcard based private application access in accordance with some embodiments.

FIG. 10 is another flow diagram illustrating a process for wildcard based private application access in accordance with some embodiments. In one embodiment, process 1000 is performed using the system architectures described above (e.g., such as described above with respect to FIGS. 1A-8B).

The process begins at 1002 where a request for access to an application over a secure access service edge (SASE) network for a user associated with an enterprise is received. For example, the SASE can be a cloud-based security service, such as similarly described above with respect to FIGS. 1A-1B.

At 1004, whether the request for access to an application matches a wildcard is determined. For example, the wildcard can be configured by an administrator of the enterprise for matching a fully qualified domain name (FQDN) for the application, such as similarly described above with respect to FIGS. 2-4.

At 1006, selecting a data center that is executing the application based on a local region, a load balancing, and/or a disaster recovery criteria is performed. For example, the data center selection criteria based on local regions, load balancing, and/or disaster recover can be performed as similarly described above with respect to FIGS. 2-7.

At 1008, automatically configuring access information for the application that matches the wildcard and is associated with the selected data center is performed. For example, the access information for the application can include an IP address, a protocol, and a destination port, such as similarly described above with respect to FIGS. 2-7.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
  receive a request for access to an application over a secure access service edge (SASE) network for a user associated with an enterprise;
  determine if the request for access to the application matches a wildcard, comprising to:
    forward the request to a domain name server (DNS) proxy or a loopback address for DNS resolution, wherein the loopback address is configured as a nameserver/relay, wherein the DNS proxy forwards the request to the nameserver/relay; and determine whether the request is resolved or is not resolved, wherein in the event that the request is not resolved, drop the request, and wherein in the event that the request is resolved, resolve the request to obtain an IP address related to the request; and automatically configure access information for the application that matches the wildcard; and a memory coupled to the processor and configured to provide the processor with instructions.

2. The system of claim 1, wherein the application is a private application executed in a data center associated with the enterprise.

3. The system of claim 1, wherein the access information includes the IP address.

4. The system of claim 1, wherein the IP address includes a private IP address.

5. The system of claim 1, wherein the access information includes the IP address and a protocol.

6. The system of claim 1, wherein the access information includes the IP address, a protocol, and a destination port.

7. The system of claim 1, wherein the wildcard is configured by an administrator of the enterprise for matching one or more fully qualified domain names (FQDNs) for the application.

8. The system of claim 1, wherein policy enforcement includes routing of traffic associated with the request using a mobile user gateway or a remote network gateway.

9. The system of claim 1, wherein policy enforcement includes routing of traffic associated with the request using a mobile user gateway or a remote network gateway, and wherein the mobile user gateway or the remote network gateway comprises an SD-WAN.

10. The system of claim 1, wherein policy enforcement includes traffic steering of traffic associated with the request using a mobile user gateway or a remote network gateway.

11. The system of claim 1, wherein policy enforcement includes traffic steering of traffic associated with the request using a mobile user gateway or a remote network gateway, and wherein the mobile user gateway or the remote network gateway comprises an SD-WAN.

12. The system of claim 1, wherein the processor is further configured to:
perform application discovery using probing.

13. The system of claim 1, wherein the processor is further configured to:
monitor flow session data of user access.

14. The system of claim 1, wherein the processor is further configured to:
periodically update a local IP address associated with the application to a virtual IP (VIP) address mapping.

15. The system of claim 1, wherein the processor is further configured to:
map the request to the application executing in a local regional data center.

16. A method, comprising:
receiving a request for access to an application over a secure access service edge (SASE) network for a user associated with an enterprise;
determining if the request for access to the application matches a wildcard, comprising:
forwarding the request to a domain name server (DNS) proxy or a loopback address for DNS resolution, wherein the loopback address is configured as a nameserver/relay, wherein the DNS proxy forwards the request to the nameserver/relay; and
determining whether the request is resolved or is not resolved, wherein in the event that the request is not resolved, dropping the request, and wherein in the event that the request is resolved, resolving the request to obtain an IP address related to the request; and
automatically configuring access information for the application that matches the wildcard.

17. The method of claim 16, wherein the application is a private application executed in a data center associated with the enterprise.

18. The method of claim 16, wherein the access information includes the IP address and a protocol.

19. The method of claim 16, wherein the access information includes the IP address, a protocol, and a destination port.

20. A computer program product embodied in a non-transitory computer readable medium and comprising computer instructions for:
receiving a request for access to an application over a secure access service edge (SASE) network for a user associated with an enterprise;
determining if the request for access to the application matches a wildcard, comprising:
forwarding the request to a domain name server (DNS) proxy or a loopback address for DNS resolution, wherein the loopback address is configured as a nameserver/relay, wherein the DNS proxy forwards the request to the nameserver/relay; and
determining whether the request is resolved or is not resolved, wherein in the event that the request is not resolved, dropping the request, and wherein in the event that the request is resolved, resolving the request to obtain an IP address related to the request; and
automatically configuring access information for the application that matches the wildcard.

* * * * *